United States Patent [19]

Aiki et al.

[11] 3,712,057
[45] Jan. 23, 1973

[54] CONTROL VALVE

[75] Inventors: Shigeo Aiki; Masahior Kito; Atumi Ueda, all of Kariya, Aichi Pref., Japan

[73] Assignee: Aisin Serki Kabushiki Kaisha, Aichi Pref. Japan

[22] Filed: Aug. 25, 1970

[21] Appl. No.: 66,693

[30] Foreign Application Priority Data

Aug. 28, 1969 Japan..................44/68237

[52] U.S. Cl...............60/54.5 P, 60/54.5 E, 303/6 C, 303/22
[51] Int. Cl...........F15b 7/00, B60t 13/00, B60t 8/18
[58] Field of Search..60/54.5 P, 54.6 P, 54.6, 54.5 E, 60/54.6 E; 303/6 C, 10, 22

[56] References Cited

UNITED STATES PATENTS

| | | | |
|---|---|---|---|
| 3,410,090 | 11/1968 | Thirion | 60/54.5 E |
| 3,467,440 | 9/1969 | Strien | 60/54.5 E |
| 3,403,944 | 10/1968 | Thirion | 303/22 R |
| 3,575,001 | 4/1971 | Wilson | 60/54.6 E |

*Primary Examiner*—Martin P. Schwadron
*Assistant Examiner*—A. M. Zupcic
*Attorney*—Pierce, Scheffler & Parker

[57] ABSTRACT

A control valve for an automotive vehicle hydraulic power brake system having a body with a bore and a differential piston reciprocable therein having an annular shoulder exposed to fluid pressure in the wheel-brake cylinders and a portion having a sectional area greater than that of the annular shoulder while receiving hydraulic pressure from the pressure source. Valve means in a passage formed in the piston is closed due to the shift of the piston at a predetermined pressure level whereby out-put pressure is boosted.

10 Claims, 2 Drawing Figures

PATENTED JAN 23 1973 3,712,057

CONTROL VALVE

BACKGROUND OF THE INVENTION

This invention relates to a control valve for a hydraulic power brake system of an automotive vehicle.

For actuating the hydraulic power brake system of the auto-motive vehicle, relatively higher pressure of hydraulic fluid is necessary than is used to operate the other devices carried by the vehicle. There is usually no pressure source to provide the necessary high pressure to operate such brake system. A method is now required for boosting the pressure of the hydraulic fluid supplied by the usual hydraulic pressure source carried by the automotive vehicle.

On the other hand, control valves have heretofore been used to apply fluid pressure of different magnitudes to a pair of dissimilar axle sets of brakes after an initial fluid pressure reaches a predetermined level in the hydraulic brake system. Usually, prior-art devices of this type were of complex construction and of large capacity due to the restoring spring of the differential piston. Accordingly, the prior-art devices have serious disadvantages which complicate the assembly thereof. Further, such devices are not adaptable for easy adjustment or for automatic compensation for the load on the wheels of the vehicle which frequently determines the switch-over point. Still further, such devices are not adaptable for easy removal of air in the hydraulic fluid in the brake system.

It is a first important object of the invention to provide a control valve which is able to boost the pressure of hydraulic fluid while being of compact structural character for controlling the pressure applied to a brake cylinder from an accumulator tank. Another object of the invention is to provide a control valve which will obviate the above mentioned disadvantages.

SUMMARY OF THE INVENTION

With these and other objects in view, the control valve of the present invention comprises generally two bodies. Within one body, a piston is reciprocably received so as to subdivide the body into a first chamber and a second chamber. The piston is formed with a passage interconnecting a fluid pressure source and the second chamber. A valve means is provided within the passage for selectively opening and closing the passage. The valve means includes a valve member displaceably mounted in the piston, throughout the length of which is formed another passage interconnecting a reservoir and the second chamber. Another valve means is provided in the passage for manually opening and closing the passage in relation to the closing and opening of the passage of the piston.

A stepped differential piston is reciprocably received in a second body so as to subdivide it into a first chamber, a second chamber and a third chamber. The piston has its end face extended into the first chamber. There is provided conduit means connecting the first chamber with the rear wheel brake cylinder and the second chamber with the front wheel brake cylinder. The piston is formed with a passage interconnecting the first and second chambers, within which a valve means is provided for selectively opening and closing the passage. The valve member of the valve means is engageable with an abutment means in an extreme position of the piston for retaining the valve means in an open position. Restoring means are provided on the differential piston to apply fluid pressure to the piston so as to urge the piston into the extreme position. The piston has an annular shoulder exposed to fluid pressure in the second chamber for applying a force to the piston in aiding relation with the force of the restoring means. The piston further has a portion, the cross-sectional area of which is greater than that of the surface of the annular shoulder and is exposed to fluid pressure in the first chamber for applying a force to the piston opposite to the force of the restoring means. The two bodies are combined into a whole so as to form interconnection between the second chamber of the one body and the first chamber of the second body.

The above and other objects, features and advantages of the present invention will become more readily apparent from the following description, reference being made to the accompanying drawing.

BRIEF DESCRIPTION OF THE DRAWINGS

The FIG. 1 is an axial cross-sectional view of a brake control valve according to the invention, with the remaining parts of the brake system shown only diagrammatically.

DESCRIPTION OF THE PREFERRED EMBODIMENT

Figures 1, 2:
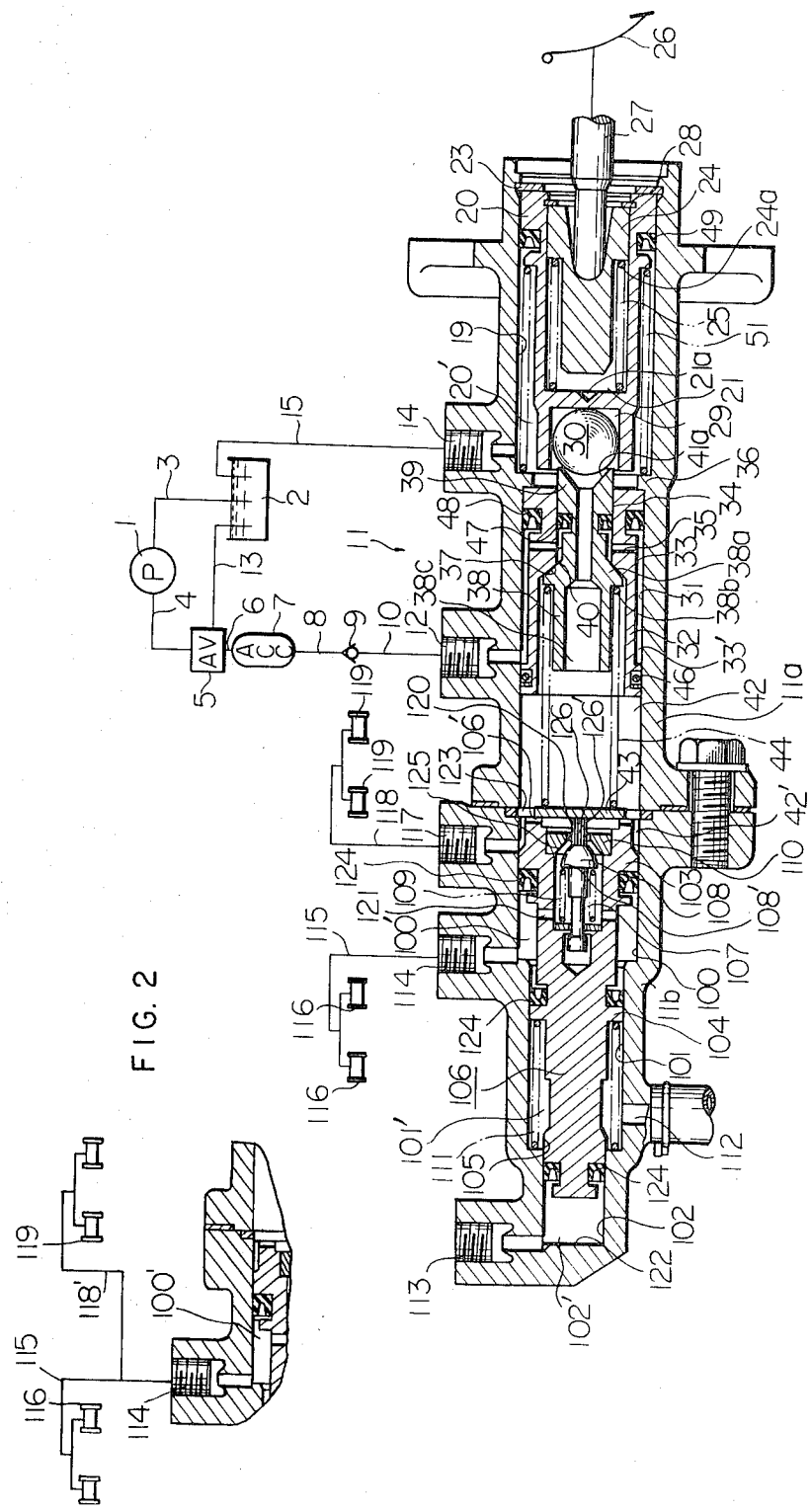
FIG. 2 is a partial view of a modification of the arrangement shown in FIG. 1.

A control valve body generally indicated by the reference character 11 is provided with an inlet 12 for the brake fluid. This inlet is connected via a hydraulic transmission line 10, a check valve 9, a transmission line 8, accumulator tank 7, transmission line 6, valve 5, and transmission line 4 to a pump 1 shown schematically in the Figure. The valve 5 is further connected to a reservoir 2 via a transmission line 13 which permits the excessive hydraulic fluid to flow to the reservoir tank when the pump supplies a larger quantity of fluid than is required to actuate the control valve. The suction conduit 3 connects the pump with the reservoir 2. An outlet 14 is connected through a transmission line 15 to the reservoir 2.

Within a bore 19 a holding member 20 is received in axially slidable relation with the wall of the body 11a. The holder 20 is normally urged by a compressed spring 51 against a snap ring 23 set in a groove formed in the wall of the body 11a. The compressed spring 51 is anchored at one end to a shoulder of the holder 20 and at the other end to a shoulder 36 formed in the wall of the body 11a. Within a bore 21 provided in the holder 20, there is slidably and fittably received a transmission member 24, the right hand end of which is normally urged by a compressed spring 25 against snap ring 28 set in a groove formed in the internal surface of the bore 21. The spring 25 is anchored at one end to a shoulder 24a of the member 24 and at the other end to the bottom surface 21a of the bore 21. A push rod 27 operatively connects the member 24 with the brake pedal 26, with its left end urged against a recess in the member 24 and the other end pivotally connected to the pedal 26. Within another bore 29 of the member 24, is normally disposed a valve 30 in the form of a ball, in freely movable condition. Adjacently to the bore 19, another cylinder bore 31 is disposed provided within which a piston 32 is axially slidably received. The piston 32 has a wide circumferential groove 33 which defines a chamber 33' in cooperation with the wall of the cylinder 31 and a sealing rings 48 and 46 are provided set in circumferential grooves formed at the ends of and adjacent the groove 33 respectively. The piston 32 is provided with a radial bore 35, communicating with the chamber 33', which opens into a central bore 34 axially extending throughout the full length of the piston. The piston 32 is formed with a valve seat 37 in the internal surface of the bore 34 for valve member 38 axially shiftable in this bore selectively to close and open the passage. The valve member 38 is formed with an annular shoulder 38b against which a spring 44 bears to urge the shoulder 38b, i.e., valve acting face 38a against the seat 37, so that the right hand end of the piston 32 is urged in turn against an annular shoulder 36 formed in the internal surface of the cylinder 31. The spring 44 at its other end bears against a retainer 43 interposed between bodies 11a and 11b. The valve member 38 is also provided with a central bore 38c extending throughout its full length and forms at its right end a valve seat 41a for the valve 30 which engages therewith when the pedal 26 is depressed by the operator as hereinafter will be described. The reference characters 47 and 49 indicate sealing rings similar to the sealing ring 48 and set respectively in corresponding circumferential grooves. In the other body 11b, there is received three stepped piston 106. The piston 106 has three portions of diametrically different size as indicated by the reference characters 103, 104 and 105. These three portions are received in slidable and fittable relation with the wall of the three cylinders 100, 101 and 102 respectively. The portions 103 and 104 define a chamber 100' in cooperation with the cylinder 100, while portions 104 and 105 define another chamber 101' in cooperation with the cylinder 101. The left end face of the piston 106 defines still another chamber 102' in cooperation with the cylinder 102 and the juxtaposed surface 122 thereof. The chamber 100' communicates with the front brake wheel cylinders 116 via outlet port 114 and transmission line 115 and chamber 101' communicates with atomospheric pressure via outlet port 112. The retainer 43 is provided with several orifices 123 which provide communication between the chamber 42 and the chamber 42' defined by the portion 103, cylinder 100 and the retainer 43. The outlet port 117 communicates with chamber 42' and with the rear wheel brake cylinder 119 through transmission line 118. The left-hand chamber 102' communicates via outlet 113 with a source of high-pressure fluid, such as the accumulator tank 7 or other accumulator tanks specifically provided. The chamber may also be pressurized by a suspension load. Sealing rings 124 are disposed respectively in the circumference grooves formed at the ends of the piston 106 to seal the chambers 101' and 102'.

At the right-hand side, the piston 106 is provided with an axial compartment 107. A cap 110 is threaded into the compartment 107 and forms a valve seat 125 for a valve member 108 axially shiftable in this compartment selectively to close and open the passage 120. The valve member 108 is formed with an annular shoulder 108' against which a spring 109 bears to urge the valve face of the valve 108 against the seat 125.

Member 108 is also provided with a stud 126 with axially extending peripheral ridges 126' which define between them passage 120 for the hydraulic fluid. Stud 126 extends through the cap 110 into engagement with the juxtaposed surface of the retainer 43. The retainer 43 constitutes abutment means for holding the valve 108, in its open position. Referring again to the piston 106, the spring 111 bears at its right hand end against the annular face of the portion 104 and at its left end against the annular end face of the cylinder 101 so as to urge the piston 106 against the retainer 43, whereby the valve 108 is held in its open position. The piston 106 is provided at its right-hand end face with radial grooves 106' which define between them passages for the hydraulic fluid. The piston 106 is further provided with radial bores 121, communicating between the chamber 100' and a central compartment 107.

Prior to initiation of braking action, the differential piston 106 is in the position shown in the FIG. When the operator depresses the pedal 26 the transmission member 24 is shifted to the left by the push rod 27, whereby the spring 25 is compressed. At a preselected force of the compressed spring 25, the holder 20 is caused to displace to the left against the force of the spring 51 and whereupon the valve 30 is urged into engagement with the seat 41a of the valve member 38 to close the passage to the reservoir 2. Additional force applied to brake pedal 26 results in the disengagement of the valve face 38a with the valve seat 37 in opposition to the force of the spring 44. The pressure of fluid is thus transmitted from the accumulator tank 7 via line 8, check valve 9, line 10, and inlet 12 to the chamber 33' and thence through the radial bore 35 past valve seat 37 into the chamber 42. The pressure of fluid within the chamber 42 is then transmitted via orifices 123, chamber 42', outlet 117 and line 118 to the rear wheel brake cylinders 119 whose piston urges the brake shoes (not shown) into engagement with the brake drum (not shown), and the brake force is effected on the rear wheel.

Referring to the front wheel brake, the piston 106 is in the position shown in the Figure i.e., biased to the right by the spring 111 whereby the valve member 108 is held open against the retainer 43. The pressure of fluid in the chamber 42' passes inwardly through passage 120 past valve seat 125 into the compartment 107. The pressure within the compartment 107 is then transmitted via radial bore 121, outlet 114 and line 115 to the front wheel brake cylinders 116 whose pistons similarly urge the brake shoes or pads into engagement with the brake drums or disks (not shown).

The cross-sectional area of the portion 104 of the piston 106 hereinafter referred to by "A4" is a surface acting against the force of the spring 111 and the pressure acting on the cross-sectional area of the portion 105 hereinafter referred to as "45". While the valve 108 is open, it may be assumed that the pressures within the chambers 100' and 42' are equal and increase uniformly so that P × A4 defines the hydraulic force F4 to displace the piston 106 to the left where P is the pressure of the fluid within the chamber 42. The piston 106 is moved to the left in FIG. 1 when the force F4 reaches a predetermined value overcoming the sum of the spring force Fs and the pressure force in the chamber 102' acting on the cross sectional area A5.

Simultaneously, rear and front wheel brake cylinders 116 and 119 are charged with hydraulic fluid at the same pressure P so that braking action is initiated.

Additional hydraulic pressure applied to the chamber 42 results in the displacement of the piston 106 sufficiently to close the valve 108, i.e., to bring the valve seat 125 into engagement with the face of the valve 108. As the hydraulic pressure in the chamber 42 increases above the said predetermined value the valve 108 remains closed, and piston 106 is moved to the left to reach a new position wherein the pressure acting on the area A3 is equal to the sum of the spring force Fs, pressure force acting on the area A5 in the chamber 102' and the pressure force acting on the annular area A3–4. Since the spring 111 and the pressure in the chamber 102' are provided with a linear response characteristic, the pressure in the chamber 100' is proportional to the pressure in the chamber 42 in the following ratio:

$$P' = P \cdot A3/(A3-4)$$

From the foregoing it will be apparent that having been closed the valve 108 causes a larger rate of increase in output pressure than the rate of increase in input pressure. Since forces on portion 103 and such forces less the forces on 104 are equal to PA3 and P'A(3-4) it will be noted that any change in the hydraulic force in the chamber 42 will result in a like change in the hydraulic force within chamber 100'. A3 is the sectional area at portion 103 and A(3-4) is an annular surface which is the difference between sectional areas A3 and A4, while P' is the pressure of the fluid in chamber 100' derived after the valve 108 is seated. Thus, pressure P' in the chamber 100' and applied to the front wheel brake cylinders 116 is a fraction of that applied to chamber 42 and to the rear wheel brake cylinders 119, the fraction being determined by the ratio of the sectional areas of the portions 103 and 104. In other words the pressure applied to the front wheel brake cylinder is greater than that applied to the rear wheel brake cylinder after the valve 108 has seated.

Upon release of the brake pedal 26 the holder 20 returns to the right whereupon the valve 38 shifts to the right under the force of the fluid within the chamber 42. The displacement of the valve 38 brings its face into engagement with the seat 37 so that application of fluid pressure from the accumulator tank 7 is cut off. Subsequent to the engagement of the valve 37, ball valve 30 disengages from the seat 41a so that the chamber 42 is brought into communication with the reservoir through the axial bore in the valve member 38, chamber 20', outlet 14 and line 15, the pressure falling rapidly. The brake is thus simultaneously released.

Upon the rapid fall of the pressure P, the piston 106 is displaced to the right under the force of the fluid pressures within chambers 100' and 102' to bring the stud into abutment against the retainer 43, thus opening the valve 108. The fluid pressure P' within the front wheel brake cylinders 116 thus falls, and the front wheel brake are released.

The reaction force applied to the operator's foot is the hydraulic force applied to the sectional area at the stem 39 of the valve 38, with the driver becoming aware of the situation. An additional force applied to the brake pedal 26 results in the further displacement of the holder 20 until it abuts the right hand end face of the piston 32. The reactionary force thereafter acting on the operator's foot is the hydraulic force applied to sectional area of the piston 32, i.e., the sectional area of the bore 31 which is greater than that of the stem 39. It is to be noted that such sudden increase of the reactionary force will serve as an obstructive force to the operator's foot.

In the case where the pump or accumulator tank is broken the control valve will act as a manually operative conventional master cylinder, in the manner described hereinbelow. When the braking action is initiated, and brake pedal is depressed, the ball valve 30 normally seats. Further application of force to the brake pedal will result in the displacement of the piston 32 due to abutment with the end face of the holder 20. The hydraulic pressure in the chamber 42 is thus derived. The piston 32 thereafter serves as the piston of a conventional master cylinder of a brake system. The operation of the other parts are as hereinbefore described.

While the hydraulic pressure applied to the chamber 102' may serve as a restoring force to the piston 106, it will be noted that a smaller space in the chamber 102' may advantageously be calculated to create any necessary restoring force that would otherwise be required by, for example, the conventional restoring spring.

Since fluid communication is permitted between the accumulator tank and the wheel brake cylinders until the pressure reaches a predetermined level in the system, i.e., until the switchover point, the fluid pressure in the accumulator tank will advantageously serve to reduce the stroke of the piston 106 which might otherwise be wasted amount before the shoes or brake pads contact the drum or discs.

It will be noted that due to this fluid communication a greater sensitivity is acquired when applying pressure to the wheel brake cylinder when initiating braking action.

It will be further noted that when both rear and front wheel brake cylinders are connected with the second chamber 100', by lines 115 and line 118', as shown in FIG. 2 the fluid pressures applied to both front and rear wheel cylinders are increased together after the initial pressure reaches a predetermined level in the system. The control valve thus serves to increase the braking force.

What is claimed is:

1. A control valve for an automotive vehicle having a hydraulic braking system comprising;
   source means of high pressure fluid,
   a valve body having a bore,
   a stepped piston slidably mounted within said bore to provide a first, a second and a third chamber, said third chamber being normally pressurized by a high pressure fluid,
   first conduit means connecting said source means of high pressure fluid to said first chamber,
   second conduit means connecting said second chamber to wheel brake cylinders of the braking system,
   passage means formed in said piston for interconnecting said first and second chambers,
   valve means in said passage means for selectively opening and closing said passage means, abutment means engageable with said valve means in an extreme position of said piston to retain said valve means in its open position, and restoring means for applying a force to said piston urging said piston into said extreme position, said piston having an annular shoulder exposed to fluid pressure in said second chamber to urge said piston in aiding relation with the force of said restoring means and the pressure within said third chamber into said extreme position and said piston having a portion of a greater cross-sectional area than that of said shoulder, said portion being exposed to fluid pressure in said first chamber to move said piston in opposition to the force of said restoring means and the pressure within said third chamber.

2. A control valve for an automotive vehicle having a hydraulic braking system comprising;

source means of high pressure fluid, a valve body having a bore, a stepped piston slidably mounted within said bore to provide a first, a second, and a third chamber, said third chamber being normally pressurized by a high pressure fluid, first conduit means connecting said source means of high pressure fluid to said first chamber, second conduit means connecting said first chamber to the rear wheel brake cylinders of the braking system, third conduit means connecting said second chamber to the front wheel brake cylinders of the braking system, passage means formed in said piston for interconnecting said first and second chambers, valve means in said passage means for selectively opening and closing said passage means, abutment means engageable with said valve means in an extreme position of said piston to retain said valve means in its open position, and restoring means for applying a force to said piston urging said piston into said extreme position, said piston having an annular shoulder exposed to fluid pressure in said second chamber to urge said piston in aiding relation with the force of said restoring means and the pressure within said third chamber into said extreme position and said piston having a portion of a greater cross-sectional area than that of said shoulder, said portion being exposed to fluid pressure in said first chamber to move said piston in opposition to the force of said restoring means and the pressure within said third chamber.

3. A control valve as set forth in claim 1, wherein said second chamber is connected with both front wheel brake cylinders and rear wheel brake cylinders.

4. A control valve as set forth in claim 1, wherein said third chamber is pressurized by hydraulic fluid pressure from said source means of high pressure fluid.

5. A control valve as set forth in claim 1, wherein said third chamber is pressurized by hydraulic fluid pressure established by the suspension load on the vehicle wheels.

6. A control valve for an automotive vehicle having a hydraulic braking system comprising;

a valve body consisting of a first and a second sub-body secured to each other as an integral unit and each having a bore, source means of high pressure fluid for supplying pressure fluid to said valve body, reservoir means to supply hydraulic fluid to said source means of high pressure fluid and receive said hydraulic fluid from said valve body, the first sub-body having a seat member disposed within said bore and subdividing said bore into a first and second chamber, conduit means connecting said first chamber to said reservoir, passage means formed in said seat member for interconnecting said source means of high pressure fluid to said second chamber, valve means in said passage means for selectively opening and closing said passage means in cooperation with said seat member, a second passage means formed in said valve means for interconnecting said first and said second chambers, a second valve means in said second passage means for opening and closing said second passage means, the second sub-body having a stepped piston reciprocable within said bore of said second sub-body and subdividing said bore into a first, a second and a third chamber, said first chamber forming with said second chamber of said first sub-body a single chamber when said two sub-bodies are secured together, conduit means to connect said second chamber to the wheel brake cylinders of the braking system, passage means formed in said stepped piston for interconnecting said first and second chambers, valve means in said passage means for selectively opening and closing same, abutment means engageable with said valve means in an extreme position of said piston to retain said valve means in its open position, and restoring means to apply a force to said piston urging said piston into said extreme position, said piston having an annular shoulder exposed to fluid pressure in said second chamber to urge said piston in aiding relation with the force of said restoring means and the pressure within said third chamber into said extreme position and said piston having a portion of a greater cross-sectional area than that of said shoulder, said portion being exposed to fluid pressure in said first chamber to move said piston in opposition to the force of said restoring means and the pressure within said third chamber.

7. A control valve as set forth in claim 6, wherein said second chamber of said second sub-body is connected with both front wheel brake cylinders and rear wheel brake cylinders.

8. A control valve as set forth in claim 6, wherein said third chamber is pressurized by hydraulic fluid pressure from said source means of high pressure fluid.

9. A control valve as set forth in claim 6, wherein said third chamber is pressurized by hydraulic fluid pressure established by suspension load on the vehicle wheels.

10. A control valve for an automotive vehicle having a hydraulic braking system comprising;
- a valve body consisting of a first and a second sub-body secured to each other as an integral unit and each having a bore,
- source means of high pressure fluid for supplying pressure fluid to said valve body,
- reservoir means to supply hydraulic fluid to said source means of high pressure fluid and receive said hydraulic fluid from said valve body,
- the first sub-body having
- a seat member disposed within said bore and subdividing said bore into a first and a second chamber,
- conduit means connecting said first chamber to said reservoir,
- passage means formed in said seat member for interconnecting said source means of high pressure fluid to said second chamber,
- valve means in said passage means for selectively opening and closing said passage means in cooperation with said seat member,
- a second passage means formed in said valve means for interconnecting said first and said second chambers,
- a second valve means in said second passage means for opening and closing said second passage means,
- the second sub-body having
- a stepped piston reciprocable within said bore of said second sub-body and subdividing said bore into a first, a second and a third chamber, said first chamber forming with said second chamber of said first sub-body a single chamber when said two sub-bodies are secured together,
- a first conduit means for connecting said first chamber to the rear wheel brake cylinders of the braking system,
- a second conduit means for connecting said second chamber to the front wheel brake cylinders of the braking system,
- passage means formed in said stepped piston for interconnecting said first and second chambers,
- valve means in said passage means for selectively opening and closing said passage means,
- abutment means engageable with said valve means in an extreme position of said piston to retain said valve means in its open position, and
- restoring means for applying a force to said piston urging said piston into said extreme position,
- said piston having an annular shoulder exposed to fluid pressure in said second chamber to urge said piston in aiding relation with the force of said restoring means and pressure within said third chamber into said extreme position and said piston having a portion of a greater cross-sectional area than that of said shoulder, said portion being exposed to fluid pressure in said first chamber to move said piston in opposition to the force of said restoring means and the pressure within said third chamber.

* * * * *